(12) United States Patent
Ellis

(10) Patent No.: US 7,600,486 B2
(45) Date of Patent: Oct. 13, 2009

(54) PET DRINKING BOWL

(75) Inventor: Natalie Ellis, 84 Undercliff Gardens, Leigh-on-Sea, Essex SS9 1BD (GB)

(73) Assignee: Natalie Ellis (GB)

( * ) Notice: Subject to any disclaimer, the term of this patent is extended or adjusted under 35 U.S.C. 154(b) by 182 days.

(21) Appl. No.: 11/568,940

(22) PCT Filed: May 10, 2005

(86) PCT No.: PCT/GB2005/001778

§ 371 (c)(1), (2), (4) Date: Nov. 10, 2006

(87) PCT Pub. No.: WO2005/107444

PCT Pub. Date: Nov. 17, 2005

(65) Prior Publication Data

US 2007/0199512 A1    Aug. 30, 2007

(30) Foreign Application Priority Data

May 10, 2004   (GB)   .................................. 0410305.7
Oct. 8, 2004   (GB)   .................................. 0422337.6

(51) Int. Cl.
  *A01K 5/01*   (2006.01)
  *A01K 1/10*   (2006.01)
  *A01K 7/00*   (2006.01)

(52) U.S. Cl. ...................... 119/61.5; 119/61.54; 119/78

(58) Field of Classification Search .............. 119/61.54, 119/61.53, 61.5, 61.55, 61.52, 72, 74, 78; D30/121, 132, 133, 129, 130; 220/719, 23.89, 220/23.87, 23.86, 23.83; 206/217, 216
See application file for complete search history.

(56) References Cited

U.S. PATENT DOCUMENTS

| 968,613 | A | * | 8/1910 | OStrand | 119/72 |
| 1,259,253 | A | * | 3/1918 | McCullough | 119/74 |
| 3,076,435 | A | * | 2/1963 | Seymour | 119/77 |
| 3,152,576 | A | * | 10/1964 | Faurot | 119/72 |
| 3,745,977 | A | * | 7/1973 | Martin | 119/73 |
| 4,286,546 | A |   | 9/1981 | Moore |  |
| 4,436,056 | A | * | 3/1984 | MacLeod | 119/72 |

(Continued)

FOREIGN PATENT DOCUMENTS

EP    0578133    1/1994

(Continued)

*Primary Examiner*—Andrea M Valenti

(57) ABSTRACT

A drinking bowl for a pet and adapted for use in a moving vehicle has a base section which defines a liquid reservoir having a cylindrical side wall and a removable in-turned rim at the upper end thereof. An inner section has sufficient buoyancy to float on liquid in the reservoir, the inner section being a close sliding fit within the side wall and having a dished upper surface with a central liquid-receiving area. A plurality of liquid feed holes extend through the inner section to permit liquid to flow into the central area from which a pet may drink.

11 Claims, 5 Drawing Sheets

U.S. PATENT DOCUMENTS

| | | | | |
|---|---|---|---|---|
| D287,772 S | * | 1/1987 | Stewart | D30/129 |
| 4,953,507 A | * | 9/1990 | Robinson | 119/73 |
| 5,209,184 A | * | 5/1993 | Sharkan et al. | 119/61.56 |
| 5,297,504 A | * | 3/1994 | Carrico | 119/61.54 |
| 5,791,287 A | * | 8/1998 | Gruber | 119/74 |
| 5,960,740 A | * | 10/1999 | Pelsor | 119/61.54 |
| 6,032,824 A | * | 3/2000 | Barrow | 220/621 |
| 6,672,248 B2 | * | 1/2004 | Bourigault | 119/63 |
| 6,751,903 B2 | * | 6/2004 | Shryock | 47/59 R |
| D559,471 S | * | 1/2008 | Dye, Jr. | D30/123 |

FOREIGN PATENT DOCUMENTS

| | | | |
|---|---|---|---|
| GB | 2352610 | | 2/2001 |
| GB | 2352610 A | * | 2/2001 |
| WO | WO 89/08420 | * | 9/1989 |

* cited by examiner

PET DRINKING BOWL

This is a national stage application filed under 35 USC 371 based on International Application No. PCT/GB2005/001778 filed May 10, 2005, and claims priority under 35 USC 119 of United Kingdom Patent Application No. 0410305.7 filed May 10, 2004 and United Kingdom Patent Application No. 0422337.6 filed Oct. 8, 2004.

This invention relates to a drinking bowl for a pet and particularly (but not exclusively) for a pet dog. Such a bowl is hereinafter referred to as a pet drinking bowl.

A typical pet drinking bowl comprises a circular container, often of pottery or moulded from a plastics material, having a wide base to give good stability to the bowl, so as to minimise the likelihood of spillage. Frequently, the bowl is internally of rounded or part-spherical shape, so as to facilitate drinking therefrom by the pet.

Owners of dogs like their pets to accompany them when using a vehicle to be away from home, but as dogs are usually excluded from public buildings, the pet may have to remain alone in a car whilst its owners conduct their business. As such, the welfare of the animal must be considered, both for the journey and subsequently when left alone in the car. It is important that the dog has adequate ventilation and also water available for drinking.

If a pet drinking bowl containing water is placed in a car, almost inevitably the water will spill when the vehicle is in motion. The part-spherical internal shape of many drinking bowls makes such spillage even more likely, and so pet owners tend to use a relatively heavy pottery bowl of a more rectangular internal shape, since this is less prone to spillage and also less prone to sliding around, for example in the rear load space of an estate car, if simply placed on the floor.

The problems of spillage have been addressed for example in U.S. Pat. Nos. 4,286,546 and 5,881,670. The latter specification provides a bowl with an internal partition which is deeply recessed and has a central hole whereby water may enter the recess from the main chamber of the bowl. Such a bowl is inconvenient for the pet to drink from, especially when the volume of remaining liquid in the main chamber falls. U.S. Pat. No. 4,286,546 proposes a solution with a floating disc having a large central hole through which the pet gains access to the water in the main chamber. The area of water accessible to the pet is relatively small but the specification proposes the use of sleeves in the hole to adjust the area to suit a pet, but the larger the hole, the greater the likelihood of spillage, especially if the bowl is subjected to the typical motion of a moving vehicle. Further, the floating disc may easily be tipped by a pet on drinking, and slopping of the water between the disc and outer container can occur.

It is a principal aim of the present invention to provide a pet drinking bowl which is suitable for use in a vehicle to provide a supply of drinking water for an animal such as a dog being carried in the vehicle, and which reduces the likelihood of any spillage of water despite motion of the vehicle when transporting the animal.

According to this invention, there is provided a pet drinking bowl comprising a base section including an upstanding side wall defining a liquid-holding reservoir, the upper end of the side wall having an in-turned rim; and an inner section freely movable generally vertically within the reservoir and having a dished upper surface defining a central liquid-receiving area, there being a plurality of relatively small feed holes through the inner section within the central liquid-receiving area, the inner section being retained within the reservoir by said rim and having sufficient buoyancy to float on liquid in the reservoir with the feed holes below the liquid surface in the reservoir so that liquid may flow into the central liquid-receiving area through the feed holes.

It will be appreciated that the drinking bowl of this invention has an inner section movable vertically within the reservoir of water but having sufficient buoyancy so as to float on the water therein. That inner section is dish-shaped but preferably is relatively shallow so that only a small quantity of water will be available for the pet in the central liquid receiving area, at the lowermost part of the upper surface of that inner section. As an animal drinks water from that central area, the water will automatically be replenished from the main reservoir through the feed holes around the central area. As the level in the reservoir falls, so too will the inner section move downwardly. In this way, replenishment of the water in the central area will continue and the animal will always have a supply of water available.

Since the inner section floats on the water in the reservoir, it acts as a lid for the reservoir and that lid is retained within the reservoir by the in-turned rim of the base section. By having the floating lid and in-turned rim, the likelihood of spillage is greatly reduced, even if the bowl is subjected to significant accelerations, horizontally and vertically, as the rim will direct any water surge up the side walls back towards the centre of the bowl. Further, as only a small quantity of water will lie in the central liquid receiving area of the inner section, the maximum volume which could be splashed on violent lateral acceleration is small.

The rim may be releasably connected to the side wall so that when removed, the inner section may then be removed from the reservoir. This will facilitate cleaning of the overall bowl, as and when required. For a moulded plastics bowl, the rim is conveniently snap-fitted to the base section.

The side wall of the base section is preferably cylindrical, though it may flare very slightly upwardly and outwardly if made from a plastics material, to allow for moulding of the base section. The inner section most preferably includes a cylindrical wall around the periphery of the dished upper surface of the inner section, which cylindrical wall is a free sliding fit within the cylindrical side wall of the base section to permit the inner section to float on water (or other liquid) in the base section. The cylindrical wall could project upwardly from the dished section or downwardly therefrom but in a preferred embodiment, the dished section has an upwardly projecting flange around the central area, which flange then joins to a cylindrical wall disposed radially outwardly of the flange and which has a sufficient length to project downwardly below the central area. This allows the provision of a relatively long sliding area between the inner section and the side wall of the base section, so reducing the likelihood of liquid passing therebetween.

The buoyancy of the inner section must be such that the feed holes are on or below the liquid level in the reservoir of the base section. For an inner section moulded from a plastics material, its buoyancy may be controlled by moulding the section from a suitable grade of plastics material or from a foamed plastics material. Instead, air-pockets could be included within the section. As an alternative, the buoyancy may be adjusted by attaching a closed-cell foam material to the underside of the inner section. In the preferred construction described above, a chamber is defined between the circular flange and the cylindrical wall, in which a buoyant material may be provided such as a closed-cell foam material. The volume of the buoyant material may be adjusted in order to give the inner section the required buoyancy to ensure sufficient filling of the central liquid-receiving area, through the feed holes.

It is highly preferred that the bowl is given considerable stability by being relatively broad but of low height. The external diameter of the bowl may be increased as compared to the internal diameter by providing an encircling skirt for the reservoir. To minimise the likelihood of movement of the bowl when positioned in a vehicle, it may be provided with a non-slip surface on its underside, for example by providing formations on the under-surface of the base section, or by attaching to that under-surface a non-slip material. Alternatively, there may be provided on the under-surface of the base section means to attach the bowl to a generally horizontal surface. Such attachment means could comprise a piece of the hook-part of a hook-and-loop fastener whereby the bowl may be attached to a fabric or carpet surface by pressing the bowl into engagement therewith. Other possibilities include providing a magnet or a magnetised sheet on the under-surface, for attraction to a metal surface such as may be found in the floor of an estate car, or an adhesive sheet protected until required for use by a strippable backing sheet. Yet another possibility is to provide a mechanical hook arrangement which may be engaged with a suitable component within a vehicle such as a dog guard, a luggage-retaining loop, or the like, which hook arrangement interconnects with the base section of the bowl.

This invention extends to a pet drinking bowl intended for use in a vehicle and provided with means to attach the bowl to a surface of the vehicle so as to prevent the bowl sliding around when carried in a moving vehicle, so reducing the risk of accidental spillage.

By way of example only, one specific embodiment of an improved pet drinking bowl of this invention will now be described in detail, reference being made to the accompanying drawings in which.

Figure 1:
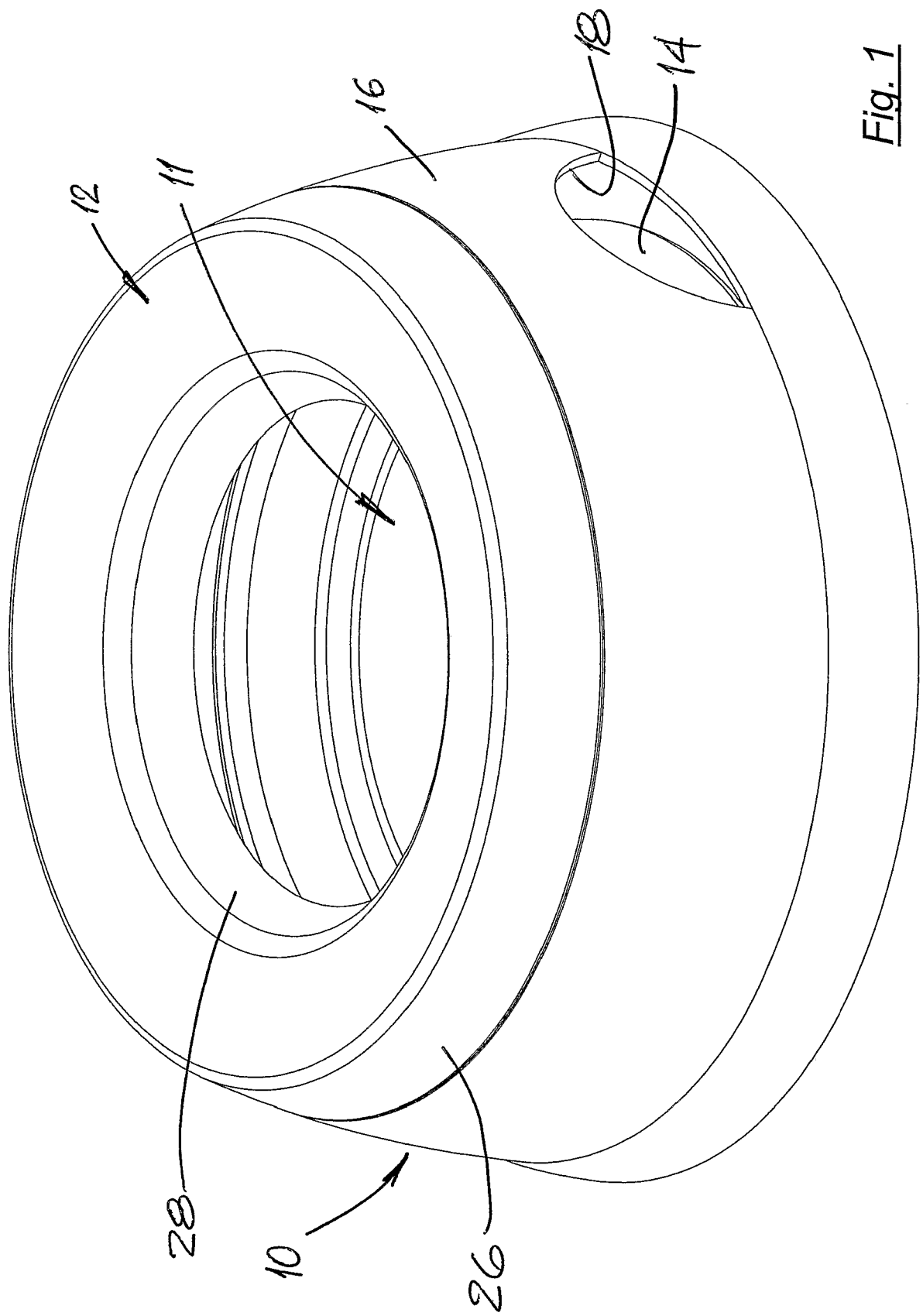
FIG. 1 is an isometric view of the assembled bowl of this embodiment.
Figure 2:
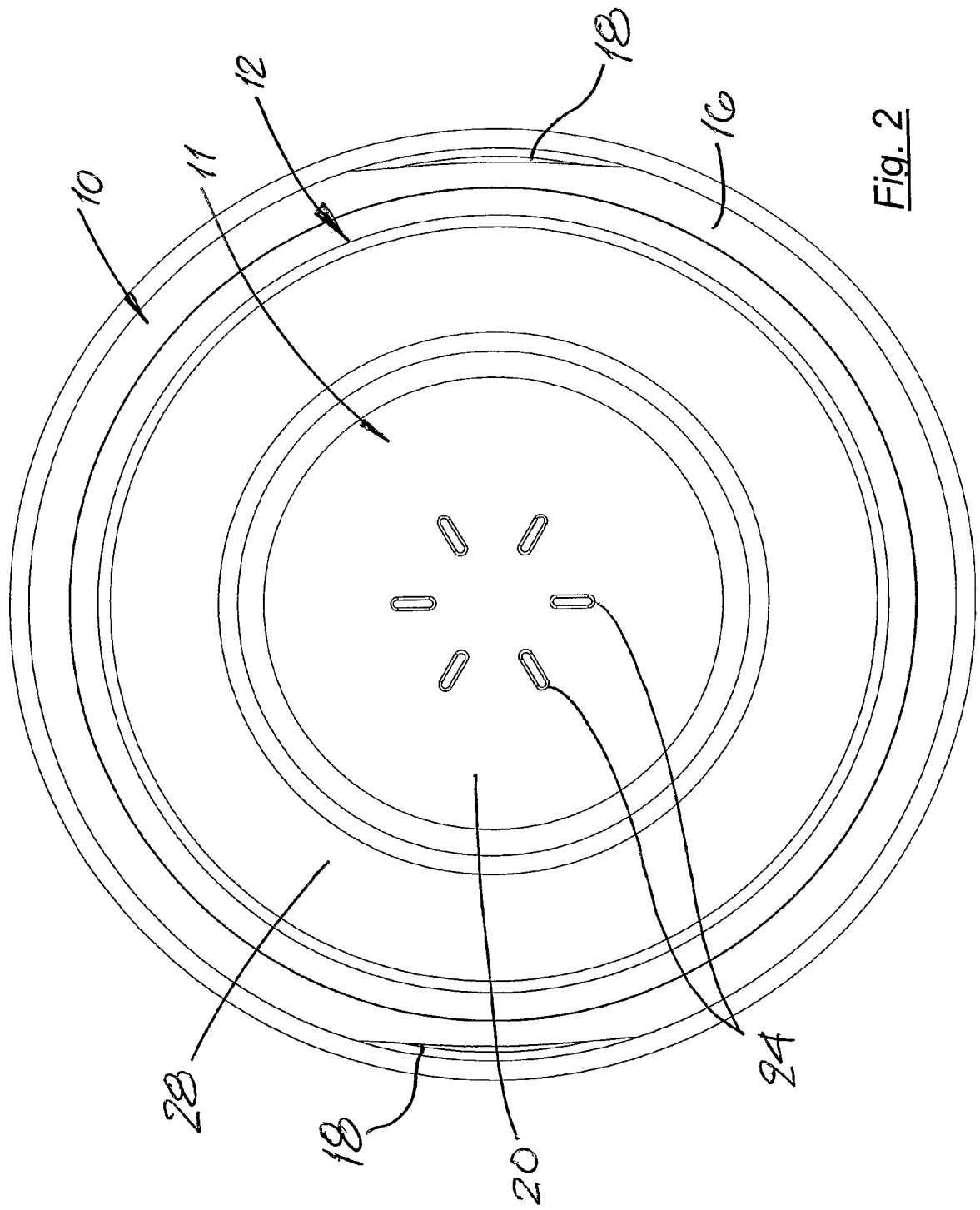
FIG. 2 is a plan view of the bowl of FIG. 1.

The bowl shown in the drawings has a base section 10, an inner section 11 and a rim portion 12, the inner section being receivable within the base section and the rim portion then being fitted to the base section so as to retain the inner section therein. These components will now be described in more detail.

Figure 3:
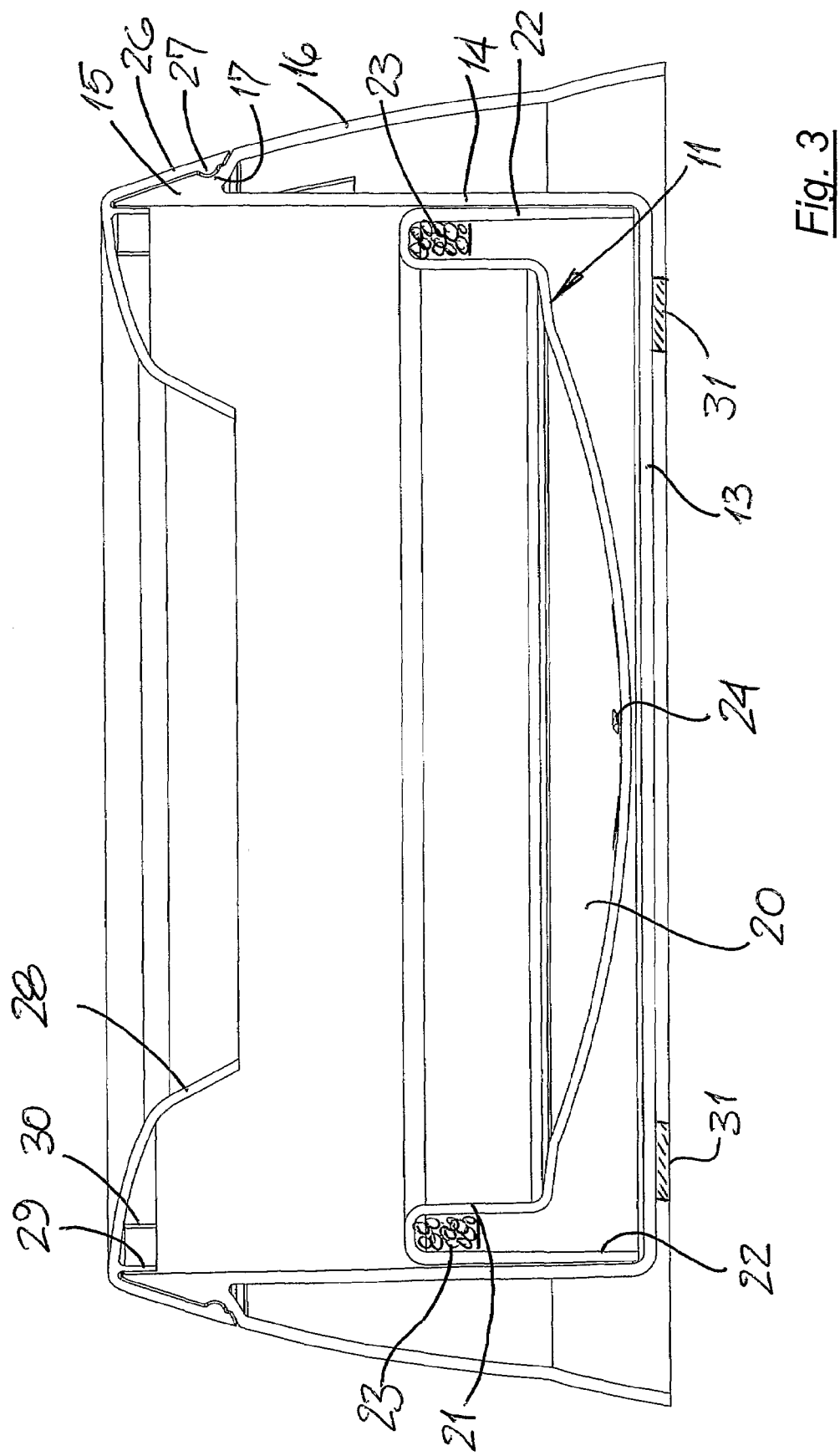
FIG. 3 is a transverse sectional view of the bowl.
Figure 4:
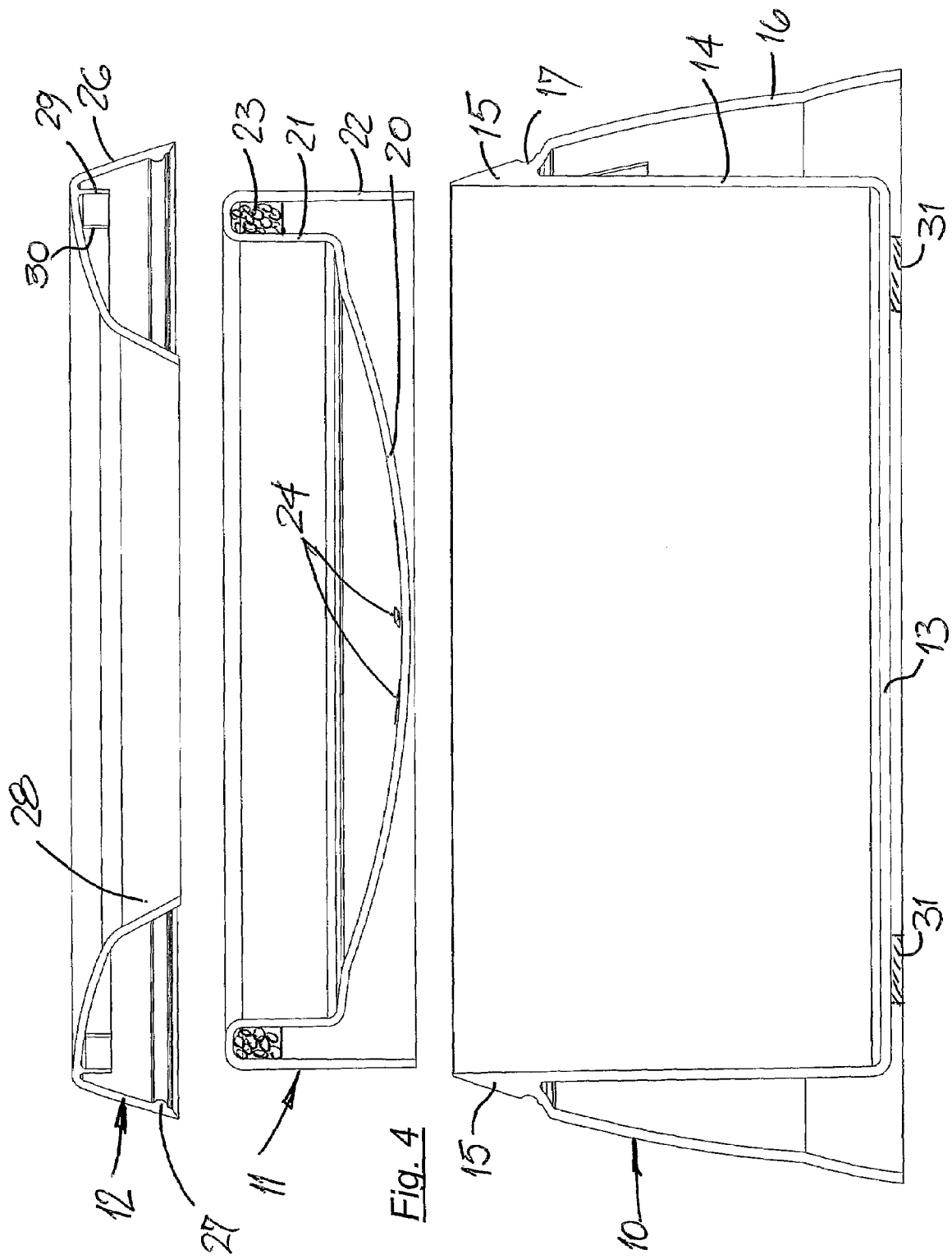
FIG. 4 is a transverse sectional exploded view of the bowl and showing the base section, inner section and rim portion.
Figure 5:
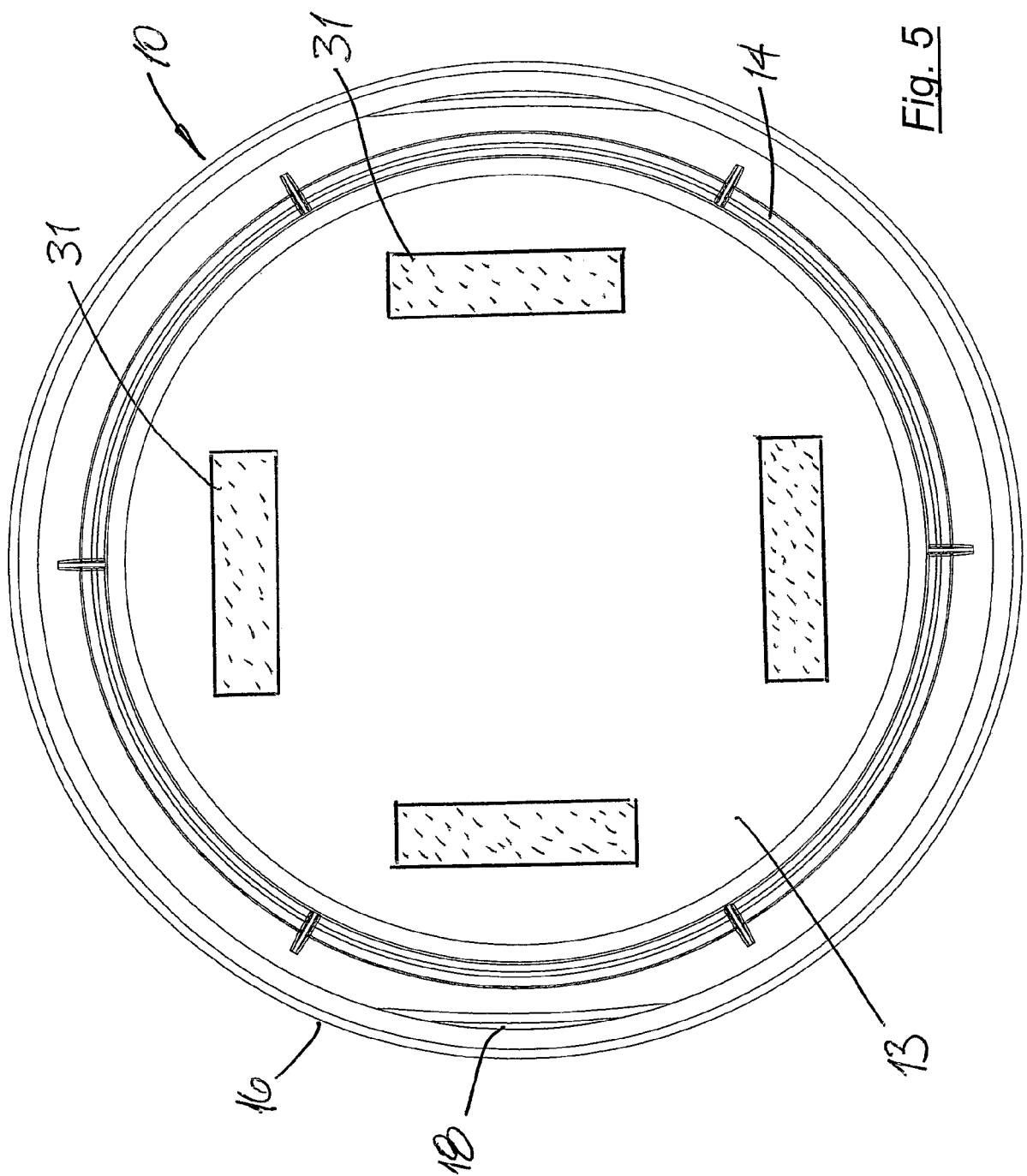
FIG. 5 is an underplan view of the bowl.

The base section 10 has a base wall 13 from which upstands a cylindrical side wall 14, the upper edge region 15 of that side wall 14 being thickened as shown in FIGS. 3 and 4. A peripheral skirt wall 16 extends downwardly from the upper edge region 15 and flares outwardly therefrom, that skirt wall 16 extending downwardly slightly beyond the underside of the base wall 13 such that the bowl will have good stability when placed on a surface. Immediately above the junction of the skirt wall 16 with the upper edge region 15, there is provided an outwardly-facing peripheral groove 17, for a purpose to be described below. The skirt wall 16 includes a pair of opposed handling apertures 18 of generally part-circular shape.

The inner section 11 has a generally dish-shaped central part 20 from the periphery of which upstands a circular flange 21. This flange is turned over at its upper end to connect to a cylindrical peripheral skirt 22 depending downwardly to about the level of the underside of the lowest part of the dish-shaped central part 20. In the cavity defined between the upstanding flange 21 and the peripheral skirt 22, there is provided a ring of closed-cell buoyancy foam 23. Around the central area of the dish-shaped central part there are provided six slot-shaped holes 24 on a common pitch circle.

The rim portion 12 has an outer wall 26 profiled to fit to the upper edge region 15 of the base section and to continue the shape of the skirt wall 16 thereof, the inner surface of the outer wall 26 being provided with an inwardly-directed circumferential rib 27 receivable in the groove 18 of the base section. The rim portion is a close fit to the upper edge region of the base section such that it may be snap-fitted to that base section to form a substantially water-tight seal between the base section and the rim portion. When connected to the base section, the profile of the external surfaces of the base section and the rim portion is essentially smooth and continuous.

The rim portion includes an in-turned wall 28 which extends in a generally curved manner down into and partway across the opening of the base section 10, as best seen in FIG. 3. A locating wall 29 is formed within the rim portion to fit closely against the inner surface of the side wall 14 of the base section and a strengthening rib 30 projects generally parallel to the locating wall to define a slot therebetween, into which the upper region of the flange 21 and skirt 22 may be received.

The base wall 13 of the base section 10 is provided with four strips 31 of the hook-part of a hook and loop fastener such as that marketed under the trade mark Velcro® so that when the base section is pressed on to a carpeted surface, the hook part will grip the threads of the carpet, and so restrain the bowl against sliding movement.

The inner section 11 should have sufficient buoyancy to float on water within the reservoir, but so that the central area of the inner section is below the water surface 32 in the reservoir. The holes 24 formed through the inner section 11 allow water to flow into the central area of the inner section. The buoyancy of the inner section may be adjusted by including a suitable quantity of closed-cell foam material 23, such that the water surface 32 is a little above the holes 24. In this way, a small quantity of water will be provided in the central area of the inner section and as a pet drinks that water, it will be replenished from the main reservoir. The inner section 11 will remain floating on the remaining water and so will descend within the reservoir, until the inner section contacts the base wall. By then, if not before, the drinking water in the reservoir should be replenished.

In use, the bowl allows there to be a supply of drinking water for a pet such as a dog carried in a car. The arrangement of the bowl including the inner section and the in-turned wall 28 of the rim portion greatly minimises the likelihood of spillage of water from the bowl, despite the motions of a car within which the bowl may be secured.

Because the base wall 13 is essentially parallel-sided and the skirt 22 of the inner section is a close sliding fit therein, there is only a relatively narrow leakage path for liquid in the main reservoir, when the bowl is subjected to lateral movements. The likelihood of any liquid in the bottom of the inner section spilling is greatly reduced by the provision of the in-turned wall 28. Should the liquid slop sideways, it will be deflected upwardly by the flange 21 and then returned back into the bowl by the presence of the in-turned wall 28.

The invention claimed is:

1. A pet drinking bowl comprising:
   a base section including a cylindrical upstanding side wall defining a liquid-holding reservoir, the upper end of the side wall having an in-turned rim; and
   an inner section having a dished upper surface defining a central liquid-receiving area, a circular flange structure around the periphery of the central area, the circular flange structure including an upwardly-projecting flange from a top surface around the periphery of the inner section, a cylindrical wall that is a free sliding fit within the cylindrical side wall of the base section, the cylindrical wall being directly conjoined to the flange to project downwardly therefrom and the cylindrical wall being spaced outwardly from the flange and a plurality of relatively small feed holes through the inner section within the central liquid-receiving area, the inner section being retained within the reservoir by said rim and having sufficient buoyancy to float on liquid in the reservoir so that liquid in the reservoir with the feed holes below the liquid surface in the reservoir so that liquid may flow into the central liquid-receiving area through the feed holes.

2. A pet drinking bowl as claimed in claim 1, wherein buoyancy for the inner section is provided by a closed-cell foam material adhered to the underside of the inner section.

3. A pet drinking bowl as claimed in claim 2, wherein the buoyancy is provided in a chamber defined between the upwardly-projecting flange and the downwardly projecting cylindrical wall.

4. A pet drinking bowl as claimed in claim 1, wherein fasteners are provided to permit the bowl to be attached to another surface.

5. A pet drinking bowl as claimed in claim 4, wherein the attachment means is provided on the underside of the base section to attach the bowl to a generally horizontal surface.

6. A pet drinking bowl as claimed in claim 5, wherein the fasteners one of a magnet, a magnetized sheet, an adhesive sheet and a piece of the hook-part of a hook-and-loop fastener, whereby fasteners permit the bowl to be attached to a surface.

7. A pet drinking bowl as claimed in claim 5, wherein the fasteners comprise a mechanical hook arrangement projecting from the base section and connectable to a component of a vehicle.

8. A pet drinking bowl as claimed in claim 1, comprising closed cell foam material in the space between the flange and the cylindrical wall.

9. A pet drinking bowl as claimed in claim 1, wherein the cylindrical wall projects downwardly substantially to the level of the feed holes.

10. A pet drinking bowl as claimed in claim 1, wherein the inner section is unitary.

11. A pet drinking bowl comprising:
a base section including a cylindrical upstanding side wall defining a liquid-holding reservoir, the upper end of the side wall having an in-turned rim; and
a unitary inner section including a central liquid-receiving portion having a dished upper surface and formed with at least one relatively small feed hole and also including a cylindrical wall that surrounds the central liquid-receiving portion and is a free sliding fit within the cylindrical side wall of the base section, unitary inner section includes a circular flange projecting around and upwardly from the top surface of a periphery of the central liquid-receiving portion and the cylindrical wall of the unitary inner section is spaced outwardly from the circular flange and is directly conjoined to an upper edge of the circular flange to project downwardly therefrom, the inner section being retained within the reservoir by said rim and having sufficient buoyancy to float on water in the reservoir with the feed hole below the water surface in the reservoir so that water may flow onto the dished upper surface through the feed hole.

* * * * *